United States Patent
Benkley et al.

(10) Patent No.: US 12,404,442 B2
(45) Date of Patent: Sep. 2, 2025

(54) WELLBORE SERVICING FLUID AND METHODS OF MAKING AND USING SAME

(71) Applicant: Halliburton Energy Services, Inc., Houston, TX (US)

(72) Inventors: James Robert Benkley, Duncan, OK (US); Travis Allen Patterson, Houston, TX (US); John Paul Bir Singh, Houston, TX (US); Ronnie Glen Morgan, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 491 days.

(21) Appl. No.: 17/980,274

(22) Filed: Nov. 3, 2022

(65) Prior Publication Data

US 2024/0150639 A1  May 9, 2024

(51) Int. Cl.
| | |
|---|---|
| *C09K 8/467* | (2006.01) |
| *C04B 24/38* | (2006.01) |
| *C04B 28/02* | (2006.01) |
| *C04B 40/00* | (2006.01) |
| *C04B 103/40* | (2006.01) |

(52) U.S. Cl.
CPC .............. *C09K 8/467* (2013.01); *C04B 24/38* (2013.01); *C04B 28/02* (2013.01); *C04B 40/0039* (2013.01); *C04B 2103/408* (2013.01)

(58) Field of Classification Search
None
See application file for complete search history.

(56) References Cited

U.S. PATENT DOCUMENTS

| | | |
|---|---|---|
| 2003/0008780 A1 | 1/2003 | Chowdhary et al. |
| 2013/0312968 A1 | 11/2013 | Ladva et al. |
| 2015/0101818 A1 | 4/2015 | Gupta et al. |
| 2022/0002610 A1* | 1/2022 | Melbouci .............. C09K 8/602 |

FOREIGN PATENT DOCUMENTS

| | | |
|---|---|---|
| WO | 2007040537 A1 | 12/2007 |
| WO | 2012116269 A2 | 8/2012 |

OTHER PUBLICATIONS

Foreign Communication from Related Application—International Search Report and Written Opinion of the International Searching Authority, International Application No. PCT/US2023/032801, dated Dec. 29, 2023, 9 pages.

* cited by examiner

*Primary Examiner* — Jeffrey D Washville
(74) *Attorney, Agent, or Firm* — Conley Rose, P.C.; Rodney B. Carroll (57) ABSTRACT

A suspending agent composition comprising (i) a fast hydrating guar gum and (ii) a high molecular weight polysaccharide, wherein the suspending agent composition has a rheological coupling ratio for yield point ranging from about 1 to about 2 when placed in an aqueous solution at a concentration of equal to or less than about 0.5 grams/deciliter and a ratio of about 90 weight percent (wt. %) fast hydrating guar gum and 10 wt. % high molecular weight polysaccharide. A wellbore servicing fluid comprising the suspending agent and methods of making and using the suspending agent.

20 Claims, 3 Drawing Sheets

WELLBORE SERVICING FLUID AND METHODS OF MAKING AND USING SAME

FIELD

This application relates to a composition, and more specifically this application relates to a wellbore servicing fluid that can be used in the recovery of natural resources from a wellbore penetrating a subterranean formation.

BACKGROUND

Hydrocarbons, such as oil and gas, residing in a subterranean formation or zone are usually recovered by drilling a wellbore down to the subterranean formation while circulating a drilling fluid in the wellbore. The drilling fluid is usually circulated downward through the interior of the drill pipe and upward through the annulus, which is located between the exterior of the drill pipe and the interior wall of the wellbore. After terminating circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Particulates are often components of wellbore servicing fluids that impart a variety of properties to the fluid. A challenge to the utilization of particulates in these fluids is the ability to retain these materials dispersed within the entirety of the fluid thereby providing uniform properties throughout the fluid. An ongoing need exists to develop novel compositions that facilitate the suspension of particulate materials in wellbore servicing fluids.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

SUMMARY

Disclosed herein is a suspending agent composition comprising (i) a fast hydrating guar gum and (ii) a high molecular weight polysaccharide (e.g., diutin gum), wherein an aqueous solution of the composition comprising about 90 weight percent (wt. %) fast hydrating guar gum and 10 wt. % high molecular weight polysaccharide at a concentration of equal to or less than about 0.5 grams/deciliter has a rheological coupling ratio for yield point ranging from about 1 to about 2.

Also disclosed herein is a wellbore servicing fluid comprising (i) a suspending agent composition comprising (1) a fast hydrating guar gum; and (2) a high molecular weight polysaccharide, wherein an aqueous solution of the composition comprising about 90 weight percent (wt. %) fast hydrating guar gum and 10 wt. % high molecular weight polysaccharide at a concentration of equal to or less than about 0.5 grams/deciliter has a rheological coupling ratio for yield point ranging from about 1 to about 2; (ii) a cementitious material; and (iii) an aqueous fluid.

Also disclosed herein is a spacer fluid comprising (i) a suspending agent composition comprising (1) a fast hydrating guar gum; and (2) a high molecular weight polysaccharide wherein an aqueous solution of the composition comprising about 90 weight percent (wt. %) fast hydrating guar gum and 10 wt. % high molecular weight polysaccharide at a concentration of equal to or less than about 0.5 grams/deciliter has a rheological coupling ratio for yield point ranging from about 1 to about 2; (ii) at least one surfactant; and (iii) an aqueous fluid.

Also disclosed herein is a method of servicing a wellbore penetrating a subterranean formation, comprising placing within a wellbore or the subterranean formation a wellbore servicing fluid comprising (i) a suspending agent composition comprising (1) a fast hydrating guar gum; and (2) a high molecular weight polysaccharide wherein an aqueous solution of the composition comprising about 90 weight percent (wt. %) fast hydrating guar gum and 10 wt. % high molecular weight polysaccharide at a concentration of equal to or less than about 0.5 grams/deciliter has a rheological coupling ratio for yield point ranging from about 1 to about 2; (ii) a cementitious material; and (iii) an aqueous fluid; and allowing the wellbore servicing fluid to set.

Also disclosed herein is a method of separating first and second fluids introduced to a wellbore comprising introducing the first fluid into the wellbore; introducing a spacer fluid to the wellbore, wherein the spacer fluid comprises: (i) a suspending agent composition comprising (1) a fast hydrating guar gum; and (2) a high molecular weight polysaccharide wherein an aqueous solution of the composition comprising about 90 weight percent (wt. %) fast hydrating guar gum and 10 wt. % high molecular weight polysaccharide at a concentration of equal to or less than about 0.5 grams/deciliter has a rheological coupling ratio for yield point ranging from about 1 to about 2; (ii) at least one surfactant; and (iii) an aqueous fluid; and introducing the second fluid to the wellbore.

Also disclosed herein is a method of servicing a wellbore within a subterranean formation comprising introducing a drilling fluid to an annular space formed between the wellbore and a conduit disposed therein; displacing at least a portion of the drilling fluid from the annular space with a spacer fluid comprising a suspending agent of the type disclosed herein; displacing at least a portion of the spacer fluid from the annular space with a cementitious fluid; and allowing the cementitious fluid to set, wherein the spacer fluid, the cementitious fluid or both comprise the suspending agent composition of the first embodiment.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein are compositions for use in suspending particulate materials in a wellbore servicing fluid. The compositions disclosed herein for suspending particulates in a wellbore servicing fluid are termed Suspending Agent Compositions and designated (SACs). In one or more embodiments, the SAC comprises a fast hydrating guar (FHG) gum. In alternative embodiments, the SAC comprises a FHG gum and a high molecular weight polysaccharide (e.g., diutan gum).

In one or more embodiments, the SAC comprises a fast hydrating guar (FHG) gum, FHG gum is the product of a series of processes that start with what are called guar splits. Guar splits are refined endosperm derived from guar seed or cluster bean (*Cyamoperm tetragonoloba*). These refined guar splits (endosperm) are mechanically separated from guar seed. The FHG gum process consists of, but is not limited to the following general steps: (i) guar splits are soaked in water until the hydrated split is about 50 to 60% water by weight; (ii) then the splits are dropped through high speed rotating drums that apply very high differential shear rates to the translucent gum splits transforming them into shreds; (iii) these shreds are then pneumatically conveyed via hot air (temperature is controlled to prevent from denaturing the galactomannans) to a high speed pin mill that simultaneously reduces the shreds to very small drying particles. The particles exit the pin mill dry (less than 10% moisture) and being only microns in size. The simultaneous evaporation in the pin milling process cools the guar particles keeping them below a specific denaturation temperature threshold. These FHG products are the result of stretching the high molecular weight guaran polymers (about 2 million Daltons) and quickly drying them into very small particle sizes, thus enhancing fast water contact and hydration.

An example of a FHG gum suitable for use in the present disclosure has a degree of hydration of equal to or greater than 50, 55, 60, 65, 70, 75, 80, or 85%, wherein degree of hydration is defined as (the three minute viscosity in cP)/(the 60 minute viscosity in cP)×100 and wherein the 3 and 60 minute viscosity is determined by (i) hydrating the FHG gum in 500 ml tap water at 75° F. using a commercially available Waring blender with a 1200 ml capacity sample container with 4 blade impeller operating at 2000 rpm to form a 0.48 wt./wt. % gum/water hydrated FHG gum solution and (ii) determining the viscosity of the hydrated gum solution using a rotating bob/sleeve viscometer at shear rate of 511 l/sec and at a temperature of 75° F. Another example of a FHG gum suitable for use in the present disclosure has a degree of hydration of equal to or greater than (25/46)×100=54%, as characterized by a viscosity in 3 minutes of 25 cP or greater and a viscosity in 60 minutes of 46 cP or greater. Another example of a FHG gum suitable for use in the present disclosure has a degree of hydration of equal to or greater than (35/46)×100=76%, as characterized by a viscosity in 3 minutes of 35 cP or greater and a viscosity in 60 minutes of 46 cP or greater.

The molecular weight of a FHG gum suitable for use in the present disclosure may range from about 20,000 Daltons to about 2,000,000 Daltons, alternatively from about 50,000 Daltons to about 2,000,000 Daltons, alternatively from about 100,000 Daltons to about 500,000 Daltons, or alternatively from about 250,000 Daltons to about 400,000 Daltons.

In one or more embodiments, the FHG gum comprises a non-ionic polysaccharide galactomannan. Galactomannans are polysaccharides consisting of a mannose backbone with galactose side groups (more specifically, a (1-4)-linked beta-D-mannopyranose backbone with branchpoints from their 6-positions linked to alpha-D-galactose). Nonlimiting examples of FHG gums suitable for use in the present disclosure include fenugreek gum, *tara* gum, locust bean gum, *cassia* gum or any combination thereof. In one or more embodiments, the gum is a product obtained from the guar splits.

In one or more embodiments, the SAC comprises a high molecular weight polysaccharide designated HMWP. In one or more embodiments, the HMWP has a weight average molecular weight ($M_w$) of at least about 10,000 g/mol (Dalton, Da), alternatively at least about 50,000 g/mol, alternatively at least about 100,000 g/mol, alternatively at least about 500,000 g/mol, alternatively at least about 1,000,000 g/mol, alternatively at least about 1,500,000 g/mol, alternatively at least about 2,000,000 g/mol, alternatively at least about 2,500,000 g/mol, alternatively at least about 3,000,000 g/mol, alternatively at least about 3,500,000 g/mol, alternatively at least about 4,000,000 g/mol, alternatively at least about 4,500,000 g/mol, or alternatively at least about 5,000,000 g/mol. In one or more embodiments, the HMWP has a weight average molecular weight ($M_w$) having an upper range end point of about 5,000,000; 6,000,000; 7,000,000; 8,000,000; 9,000,000; or 10,000,000 g/mol. In one or more embodiments, the HMWP has a weight average molecular weight ($M_w$) in a range of from about 10,000 to about 5,000,000 g/mol; alternatively, in a range of from about 100,000 to about 5,000,000 g/mol; alternatively, in a range of from about 500,000 to about 5,000,000 g/mol; alternatively, in a range of from about 1,000,000 to about 5,000,000 g/mol; or alternatively, in a range of from about 1,000,000 to about 3,000,000 g/mol. Nonlimiting examples of HMWPs suitable for use in the present disclosure include diutan gum, welan gum, xanthan gum and a combination thereof.

In one or more embodiments, the HMWP comprises diutan gum. Diutan gum is a bio-fermented polymer, specifically an anionic extracellular polysaccharide, produced by an isolated naturally-occurring bacterial strain of the *Sphingomonas* genus. Diutan gum is composed of a six-sugar unit where the backbone is made up of d-glucose, d-glucuronic acid, d-glucose, and l-rhamnose, and the side chain of two l-rhamnose.

Xanthan gum is commonly used in drilling fluids to provide viscosity, solid suspension, and fluid-loss control. However, it is sensitive to high temperatures and not tolerant of field contaminants. Diutan gum offers the same functions but overcomes the deficiencies of xanthan gum consequently, diutan gum is used mainly to adjust the viscosity of freshwater, seawater, or saline muds and provide a measure of filtration control. Diutan gums, e.g., average molecular weight of $5\times10^6$ Daltons, have a double helix tertiary structure making it structurally closer to that of welan gum than that of xanthan gum. Viscous aqueous diutan gum solutions have a high water retention capacity, salt tolerance, suspending power, and thermal stability ranging from about 5° C. to about 150° C. Diutan gum is stable across a wide pH range and can be used in weighted and unweighted drilling fluids, completion fluids, and other systems.

In one or more embodiments, a FHG gum and/or a HMWP may be used in any suitable form. For example, the FHG gum may be characterized by rapid/accelerated uncoiling and hydration of the helical structure of guar, for example averaging about 1.9 Daltons to about 2.2 million Daltons in molecular weight. The rapid viscosifying performance of the FHG gum is achieved with unique in-situ grinding to particles ranging in size from about 5 microns to about 20 microns. Thus, the FHG gum has the opportunity to quickly uncoil and entangle with nearby molecules.

The SAC disclosed herein may be prepared in a solid state by the blending of an FHG gum with the HMWP (e.g., diutan gum) to form a SAC blend. For example, the FHG gum and the HMWP (and the resultant SAC blend) can be in a suitable solid form such as granular, particulates or powder, and can be packaged in suitable containers such as bags, sacks, drums, totes, modular reusable containers, enclosed trailers, etc. The FHG gum, the HMWP, or both can be dry or substantially dry, for example having a water content of equal to or less than 5, 4, 3, 2, 1, 0.5, 0.1, 0.05, 0.01, 0.005, 0.001, 0.0005, or 0.0001 weight percent. Without wishing to be limited by theory, during the rapid uncoiling of the FHG gum upon hydration of the SAC blend, these FHG gum molecules couple or form entanglements with the HMWP structure. Upon hydration of a SAC blend, the result is a complex formed between the HMWP and FHG gum that acts as a viscosifier and suspension agent for a wellbore servicing fluid (e.g., an aqueous based wellbore servicing fluid such as a cementitious slurry) comprising the SAC. A SAC of the type disclosed herein (e.g., comprising a FHG gum in combination with HMWP) advantageously provides benefits that are absent from the use of either FHG gum alone or HMWP alone. If FHG were used alone, it is very sensitive to the high pH effects of cement slurries and thus does not provide sufficient suspension properties when used alone. If HWMP were used alone, the HMWP is effective as a viscosifier in such small amounts that it is challenging to dry blend the HMWP with other solids used in the preparing the wellbore servicing fluid (e.g., cementitious material).

In embodiments, the SAC comprises a mixture (e.g., dry blend) of a FHG and a HMWP which are present in a ratio of FHG gum:HMWP of about 5:5 or alternatively about 7:3 or, alternatively about 9:1.

In one or more embodiments, a SAC of the type disclosed herein, when added to an aqueous fluid, is an effective viscosifier at a pH range of from about 7 to about 14, alternatively from about 7 to about 9, alternatively from about 9 to about 11 or alternatively from about 11 to about 14.

A SAC suitable for use in the present disclosure may be further characterized by the rheological properties of the composition when added to an aqueous fluid (e.g., water). For example, a solution comprising, consisting of, or consisting essentially of, a FHG gum, a HMWP and water may have rheological properties (e.g., plastic viscosity, yield point, AVIS-100, or a combination thereof) that make it suitable for use as a SAC of the type disclosed herein.

In one or more embodiments, an aqueous fluid comprising a SAC of the type disclosed herein is characterized by a plastic viscosity of from about 5 centipoise (cP) to about 300 cP, alternatively form about 5 cP to about 15 cP, alternatively from about 15 cP to about 50 cP or, alternatively from about 50 cP to about 300 cP. The plastic viscosity of a fluid is related to the resistance of that fluid to flow due to mechanical interactions between the components of the fluid. The plastic viscosity of a fluid may be calculated by measuring the shear stress of the fluid using a viscometer at specified shear rates.

In one or more embodiments, an aqueous fluid comprising a SAC of the type disclosed herein is characterized by yield point of from about 0.5 Pascals (Pa) to about 50 Pa, alternatively from about 2 Pa to about 5 Pa, alternatively from about 5 Pa to about 25 Pa or, alternatively from about 25 Pa to about 50 Pa. The yield point (YP) represents the minimum shear stress required to make a fluid flow. If a fluid is subjected to a shear stress less than the fluid's yield point, then the fluid will behave as a rigid body. If a fluid is subjected to a shear stress at or greater than the fluid's yield point, then the fluid will flow. The yield point is also representative of a fluid's carrying capacity. A fluid with a greater yield point will be able to carry more mass.

In one or more embodiments, an aqueous fluid comprising a SAC of the type disclosed herein is characterized by an AVIS-100 value of from about 10 cP to about 1500 cP, alternatively from about 10 cP to about 1200 cP, alternatively from about 20 cP to about 1500 cP, alternatively from about 20 cP to about 50 cP, alternatively from about 50 cP to about 250 cP or, alternatively from about 250 cP to about 1500 cP. The AVIS-100 value refers to the apparent viscosity of the composition at shear rate of 100/sec as determined by dividing the shear stress computed at a shear rate of 100 l/sec by the shear rate of 100 l/sec. For a Bingham Plastic AVIS-100=(YP+100*PV)/100, where AVIS-100 will be in units of cP, YP in units of Pa and PV in units of cP.

In one or more embodiments, a SAC of the type disclosed herein has characteristics indicative of a synergistic interaction between the HMWP and a FHG gum. In one or more embodiments, the HMWP and FHG gum are rheologically coupled. Herein the rheological coupling may be indicated by the rheological coupling ratio. Herein the quantitative definition of the effectiveness of the "Rheological Coupling Ratio (RCR)" is defined as given below for the rheological property of Yield Point:

$$RCR_{YP} = \frac{YPNR_{DG+FHGG,c1+c2}}{YPNR_{DG,c1} + YPNR_{FHGG,c2}} \qquad [1]$$

Where:

$$YPNR_{DG,c1} = \frac{YP_{DG,c1} - YP_{,0}}{YP_{,0}} \qquad [2]$$

$$YPNR_{FHGG,c2} = \frac{YP_{FHGG,c2} - YP_{,0}}{YP_{,0}} \qquad [3]$$

$$YPNR_{DG+FHGG,c1+c2} = \frac{YP_{DG+FHGG,c1+c2} - YP_{,0}}{YP_{,0}} \qquad [4]$$

$YP_{DG,c1}$=Yield Point of slurry with diutan gum in slurry at concentration of c1 g/dl $YP_{FHGG,c2}$=Yield Point of slurry with FHG gum in slurry at concentration of c2 g/dl $YP_{DG+FHGG,c1+c2}$=Yield Point of slurry with combination of diutan gum at c1 g/dl and FHG gum at c2 g/dl.

$YP_o$=Yield Point of slurry with no gum or polymer in the slurry

The above definition of $RCR_{YP}$ (Rheological Coupling Ratio) for Yield Point can be readily expanded to other rheological parameters, including but not limited to, apparent viscosity at a given shear rate. In one or more embodiments, a SAC comprising about 90% FHG gum and 10% diutan gum when placed in a solution at a concentration of equal to or less than about 0.5 grams/deciliter has a $RCR_{YP}$ ranging from about 1 to about 2.

Figure 2:
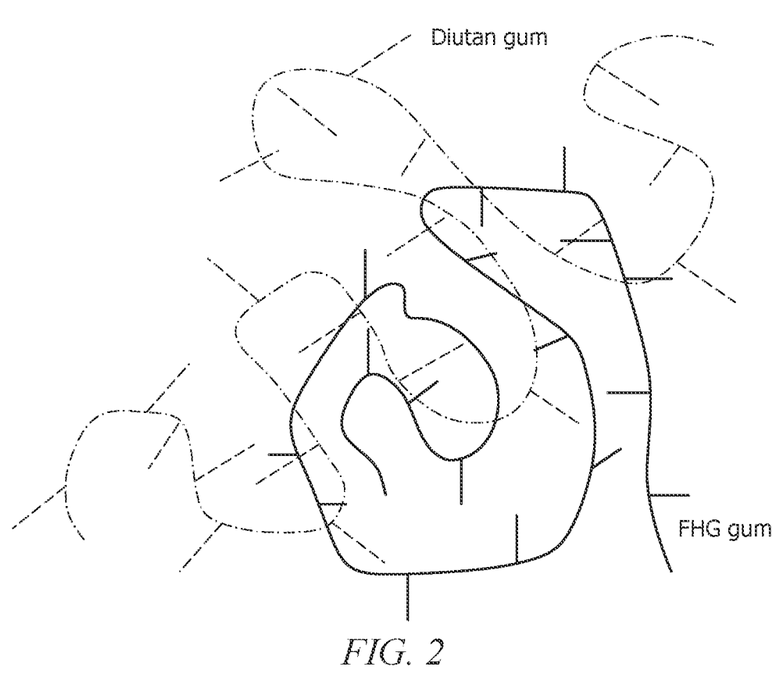
FIG. 2 is a schematic depiction of the interaction of diutan gum and FHG.

Without being limited by theory, rheological coupling occurs when the FHG gum rapidly hydrates in an aqueous solution and begins to hydraulically unfold, it is entangled with or coupled with the higher molecular weight diutan gum which is not affected by the high pH of the cement slurry. The diutan gum provides a support structure for capturing the viscosifying power of the FHG gum that has rapidly hydrated. Therefore, since sufficient quantity of shear and mixing occurs in the API Lab Blending procedure, as well as on the actual rig site location during a cementing job, this mixing enhances the "Rheological Coupling" that is depicted in the sketches in FIG. 2. Several physical mechanisms are needed to simultaneously occur to maximize the rheological coupling these being but not limited to: (i) sufficient shearing and mixing to quickly hydrate the diutan gum and the FHG gum before enough of the cement hydrates so as to increase the pH that would "shrink" the FGH gum macromolecules before they could "couple" with the diutan gum; (ii) low initial mixing viscosity; and (iii) FHG gum that is fast hydrating thus allowing the rheological coupling" to occur before the pH of the slurry inhibits when using an FHG gum of the type disclosed herein. Accordingly, further disclosed herein is a method of making a wellbore servicing fluid, comprising: blending (i) a suspending agent composition comprising (1) a fast hydrating guar gum; and (2) a high molecular weight polysaccharide, ii) a component selected from the group consisting of a cementitious material and a surfactant (e.g., a component that increases the pH of the wellbore servicing fluid during hydration and/or reaction of the component in the servicing fluid); and (iii) an aqueous fluid, wherein the blending is performed (a) for a time effective to hydrate the suspending composition before the pH of the wellbore servicing fluid exceeds (e.g., via hydration of the component that increases the pH of the wellbore servicing fluid) a pH effective to retard hydration of the fast hydrating guar gum and (b) under shearing conditions (e.g., shearing conditions such as high shear mixing or blending of the type produced by a commercial wellbore servicing fluid blender used at a wellsite to prepare a homogenous wellbore servicing fluid in sufficient quantities for use downhole) effective to hydrate the suspending composition before the pH of the wellbore servicing fluid exceeds (e.g., via hydration of the component that increases the pH of the wellbore servicing fluid) a pH effective to retard hydration of the fast hydrating guar gum. The pH effective to retard hydration of the fast hydrating guar gum can be equal to or greater than about 10, alternatively equal to or greater than about 10 and equal to or less than about 13, or alternatively equal to or greater than about 11 and equal to or less than about 13. The time effective to hydrate the suspending composition before the pH of the wellbore servicing fluid exceeds a pH effective to retard hydration of the fast hydrating guar gum can be from about 1 to about 10 minutes, alternatively from about 3 to about 7 minutes, alternatively from about 4 to about 6 minutes, alternatively about 5 minutes. With the aid of this disclosure, such pH and/or time for a given wellbore servicing composition may be further investigated by a person of ordinary skill via routine empirical testing such as a design of experiments.

In one or more embodiments, the SAC is a component in a wellbore servicing fluid comprising a cementitious material (e.g., a pumpable cementitious slurry). In one or more embodiments, the SAC is a component in a spacer fluid. In such embodiments, the SAC functions to retard the settling of particulate materials in the wellbore servicing fluid. The amount of a SAC that may be included in a wellbore servicing fluid may depend on a number of factors, such as, the bottom hole circulating temperature of the well into which the wellbore servicing fluid is to be placed.

In one or more embodiments, the wellbore servicing fluid (e.g., cementitious slurry) in which a SAC is included comprises a cementitious material. The cementitious material can comprise calcium, aluminum, silicon, oxygen, iron, and/or sulfur. In one or more embodiments, the cementitious material comprises Portland cement, porzolana cement, gypsum cement, shale cement, acid/base cement, phosphate cement, high alumina content cement, slag cement, silica cement, high alkalinity cement, magnesia cement, cement kiln dust, lime kiln dust or combinations thereof.

Portland cements that are suitable for use with a SAC include, but are not limited to, Class A, C, G, H, K, L, low sulfate resistant cements, medium sulfate resistant cements, high sulfate resistant cements, or combinations thereof. The class A, C, G, H, K, and L cements are classified according to API Specification 10. Additional examples of Portland cements suitable for use in the present disclose include, without limitation, those classified as ASTM Type I, II, III, IV, IL, or V. In embodiments, the cementitious material comprises Class G. Class H, Class A, Class C, Class K, Class L cements or combinations thereof. The cementitious material can be present in the wellbore servicing fluid in an amount of from about 10 wt. % to about 95 wt. %, alternatively from about 10 wt. % to about 29 wt. %, alternatively from about 30 wt. % to about 50 wt. %, or alternatively from about 50 wt. % to about 95 wt. % based on the total weight of the wellbore servicing fluid.

The wellbore servicing fluid (e.g., cementitious slurry) can include an aqueous fluid. Generally, the aqueous fluid may be from any source, provided that it does not contain an amount of components that may undesirably affect the other components of the wellbore servicing fluid. For example, the aqueous fluid can comprise fresh water, surface water, ground water, produced water, salt water, sea water, brine (e.g., underground natural brine, formulated brine, etc.), or a combination thereof.

In some embodiments, the aqueous fluid includes a brine. In one or more embodiments, the brine includes monovalent or divalent salts such as, sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, or a combination thereof. A formulated brine may be produced by dissolving one or more soluble salts in water, a natural brine, or sea water. The brine can be saturated or unsaturated.

The wellbore servicing fluid may comprise the aqueous fluid and the cementitious composition in an amount effective to provide a pumpable cementitious slurry, such as a slurry having desired (e.g., job or service specific) rheological properties. In one or more embodiments, the aqueous fluid is added to the cementitious composition in an amount of from about 2 volume percent (vol. %) to about 37 vol. %, alternatively from about 2 vol. % to about 5 vol. % based on the total volume of the wellbore servicing fluid, alternatively from about 7 vol. % to about 10 vol. %, or alternatively from about 12 vol. % to about 37 vol. % based on the total volume of the wellbore servicing fluid.

In one or more embodiments, the SAC is present in the wellbore servicing fluid (e.g., cementitious slurry) in an amount in the range of from about 0.01 wt. % to about 1 wt. %, alternatively from about 0.05 wt. % to about 1.0 wt. %, alternatively from about 0.05 wt. % to about 0.15 wt. %, alternatively from about 0.2 wt. % to about 0.5 wt. %, or alternatively from about 0.6 wt. % to about 1.0 wt. %, based on the total weight of the wellbore servicing fluid.

In one or more embodiments, the wellbore servicing fluid (e.g., cementitious slurry) further comprises one or more additives. The one or more additives can comprise weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, thixotropic additives, or combinations thereof. In embodiments, the one or more additives are present singularly or in combination in amounts effective to achieve some user and/or process objective.

In one or more embodiments, the SAC is a component of a spacer fluid. Herein a spacer fluid refers to any liquid used to physically separate one special-purpose liquid from another, such as a cementitious composition from a drilling mud. Special-purpose liquids are typically prone to contamination, so a spacer fluid having rheological properties similar to those of the fluids being separated will be more effective. In one or more embodiments, a spacer fluid of the present disclosure comprises a base fluid, a surfactant package, and a SAC.

In one or more embodiments, a surfactant suitable for use in the spacer fluid can include a cationic surfactant, an anionic surfactant, an amphoteric surfactant, a zwitterionic surfactant, a non-ionic surfactant, or combinations thereof. Surfactants in general are wetting agents that lower the surface tension of a liquid in which they are dissolved, allowing easier spreading and decreasing the interfacial tension between two liquids. Each surfactant has a hydrophilic head that is attracted to water molecules and a hydrophobic tail that repels water and attaches itself to hydrophobic materials such as oil and grease. Nonlimiting examples of a surfactant suitable for use in the present disclosure include a fatty acid alkoxylate, an amine oxide, alkanolamide, an alkoxylated alcohol, an alkylamine alkoxylate, an alkyl glycoside surfactant, a polyethylene glycol-initiated polyol, an ethylene glycol additive, a diethanolamide of tall-oil fatty acid (TOFA), a sorbitol-initiated polyol, or a combination thereof. The surfactant may be present in the spacer fluid in an amount of from about 0.25 gallons/barrel (gal/bbl) to about 1.5 gal/bbl, alternatively from about 0.25 gal/bbl to about 0.5 gal/bbl, alternatively from about 0.75 gal/bbl to about 1.0 gal/bbl or alternatively from about 1.25 gal/bbl to about 1.5 gal/bbl based on the weight of the spacer fluid. These same liquids can be added as powder additives at the proper activity of the liquid.

The spacer fluid can include an aqueous fluid. Generally, the aqueous fluid may be from any source, provided that it does not contain an amount of components that may undesirably affect the other components in the wellbore servicing fluid. For example, the aqueous fluid can comprise fresh water, surface water, ground water, produced water, salt water, sea water, brine (e.g., underground natural brine, formulated brine, etc.), and combinations thereof.

In one or more embodiments, the SAC is present in the spacer fluid in an amount in the range of from about 0.05 wt. % to about 1.0 wt. %, alternatively from about 0.05 wt. % to about 0.15 wt. %, alternatively from about 0.2 w-t. % to about 0.5 wt. %, or alternatively from about 0.6 wt. % to about 1.0 wt. %, based on the total weight of the spacer fluid.

In one or more embodiments, the SAC is introduced to a wellbore serving fluid to adjust the rheological properties of the wellbore servicing fluid to a range that fulfills some user and/or process objective. In one or more embodiments, a SAC of the type disclosed herein when introduced to a cementitious composition is then formulated into a cement slurry characterized by a plastic viscosity of from about 2 cP to about 300 cP, alternatively from about 5 cP to about 300 cP, alternatively from about 5 cP to about 30 cP, alternatively from about 30 cP to about 50 cP, or alternatively from about 50 cP to about 300 cP.

In one or more embodiments, a SAC of the type disclosed herein when introduced to a spacer fluid results in the spacer fluid being characterized by a plastic viscosity of from about 10 cP to about 300 cP, alternatively from about 10 cP to about 30 cP, alternatively from about 30 cP to about 50 cP, or alternatively from about 50 cP to about 300 cP.

In one or more embodiments, a SAC of the type disclosed herein when introduced to a cementitious composition is then formulated into a cement slurry characterized by a yield point of from about 0.5 Pa to about 35 Pa, alternatively from about 2 Pa to about 35 Pa, alternatively from about 5 Pa to about 35 Pa, or alternatively from about 10 Pa to about 35 Pa.

In other embodiments, a SAC of the type disclosed herein when introduced to a spacer fluid results in the spacer fluid being characterized by yield point of from about 2 Pa to about 50 Pa, alternatively form about 2 Pa to about 10 Pa, alternatively from about 10 Pa to about 20 Pa or alternatively from about 20 Pa to about 50 Pa.

The wellbore servicing fluids disclosed herein (e.g., a cementitious slurry or spacer fluid) can have any suitable density, including, but not limited to, in a range of from about 7 pounds per gallon (ppg) to about 22 ppg, alternatively from about 7 ppg to about 9 ppg, alternatively from about 9 ppg to about 16 ppg, or alternatively from about 16 ppg to about 22 ppg.

A wellbore servicing fluid of the type disclosed herein can be prepared using any suitable method. In one or more embodiments, the method includes mixing components (e.g., a cementitious material, an aqueous fluid, and a SAC) of the wellbore servicing fluid using mixing equipment (e.g., a jet mixer, re-circulating mixer, a batch mixer, a blender, a mixing head of a solid feeding system) to form a pumpable fluid or slurry (e.g., a homogeneous fluid). Any container(s) that is compatible with the components and has sufficient space can be used for mixing.

In one or more embodiments, mixing the components of the composition can be on-the-fly (e.g., in real time or on-location). In some embodiments, the mixing equipment may be disposed on one or more trucks as will be apparent to those of ordinary skill in the art. In some embodiments, a jet mixer may be used, for example, to continuously mix components of the wellbore servicing fluid as it is being pumped to the wellbore. In one or more embodiments, a re-circulating mixer and/or a batch mixer may be used to mix a first group of components of the wellbore servicing fluid and a second group of components of the wellbore servicing fluid may be added to the mixer prior to pumping the wellbore servicing fluid downhole. Additionally, batch mixer type units for the first group of components may be plumbed in line with a separate tank containing the second group of components. The second group of components may then be fed in-line with the first group of components as it is pumped out of the mixing unit.

The wellbore servicing fluid can be prepared at a wellsite or remote from a wellsite. For example, some components of the wellbore servicing fluid (e.g., cementitious material. SAC) can be transported to the wellsite and combined (e.g., mixed/blended) with an aqueous fluid located proximate the wellsite to form the wellbore servicing fluid. The aqueous fluid can be conveyed from a source (e.g., sea) to the wellsite or be available at the wellsite prior to the combining. Some components can be prepared at a location remote from the wellsite and transported to the wellsite, and, if necessary, stored at the on-site location. When it is desirable to prepare the wellbore servicing fluid at the wellsite, the components along with additional aqueous fluid and optional other additives can be mixed to form a mixture (e.g. in a blender tub, for example mounted on a trailer).

The method disclosed herein can further include placing the wellbore servicing fluid into a wellbore penetrating at least a portion of a subterranean formation. In embodiments, placing the wellbore servicing fluid into the subterranean formation uses one or more pumps.

In one or more embodiments, a method of the present disclosure comprises placing into a wellbore a wellbore servicing fluid comprising a cementitious material, water and a SAC of the type disclosed herein. The method may further comprise allowing the fluid to set.

In one or more embodiments, a method of the present disclosure comprises circulating within a wellbore a drilling fluid downward through the interior of pipe disposed within the wellbore and upward through the annulus; and placing a wellbore servicing fluid comprising a SAC into the wellbore prior to introducing another wellbore servicing fluid to the wellbore.

In one or more embodiments, a wellbore servicing fluid comprising a SAC may be employed in well completion operations such as primary and secondary cementing operations. The wellbore servicing fluid comprising a SAC may be placed into an annulus of the wellbore and allowed to set such that it isolates the subterranean formation from a different portion of the wellbore. The wellbore servicing fluid comprising a SAC thus forms a barrier that prevents fluids in the subterranean formation from migrating into other subterranean formations. Within the annulus, the wellbore servicing fluid comprising a SAC also serves to support a conduit, e.g., casing, in the wellbore. In an embodiment, the wellbore in which the wellbore servicing fluid comprising a SAC is positioned belongs to a multilateral wellbore configuration. It is to be understood that a multilateral wellbore configuration refers to a primary wellbore with one or more secondary wellbore branches radiating from the primary borehole. In secondary cementing, often referred to as squeeze cementing, the wellbore servicing fluid comprising a SAC may be strategically positioned in the wellbore to plug a void or crack in the conduit, to plug a void or crack in the hardened fluid (e.g., cement sheath) residing in the annulus, to plug a relatively small opening known as a microannulus between the hardened sealant and the conduit, and so forth.

In one or more embodiments, the SAC is a component of a spacer fluid. In such embodiments, the spacer fluids comprising a SAC generally may be utilized as a buffer between two fluids during subterranean operations. For example, in some embodiments, the spacer fluids comprising a SAC may be pumped into a well bore between a first fluid and a second fluid. The first fluid may be displaced with the spacer fluids comprising a SAC, and the spacer fluids comprising a SAC should be displaced with the second fluid. Among other things, the spacer fluids comprising a SAC should be compatible with the fluid that it is displacing and the second fluid that is displacing the spacer fluids comprising a SAC, in that there should be no undesirable interactions between the spacer fluids comprising a SAC and the first or the second fluid. Generally, the first fluid may be any fluid that the spacer fluid should displace, such as drilling fluids. The second fluid may be any fluid desired to be introduced into the well bore, such as cement compositions, drilling fluids, completion brines, and the like. In an embodiment, a first fluid (e.g., drilling fluid) is displaced downhole (e.g., displaced from a casing annulus during primary cementing) by a spacer fluid, and the spacer fluid is displaced downhole (e.g., displaced from a casing annulus during primary cementing) by a second fluid (e.g., cementitious slurry), wherein the spacer fluid, the cementitious slurry, or both comprise a SAC of the type disclosed herein. In one or more embodiments, a method comprising displacing a first fluid from a wellbore (e.g., displacing a drilling fluid from a casing annulus during primary cementing) by introducing a spacer fluid to the wellbore (e.g., casing annulus), the spacer fluid comprising: (i) a suspending agent composition comprising (1) a FHG gum; and (2) a high molecular weight polysaccharide; (ii) at least one surfactant; and (iii) an aqueous fluid; and displacing the spacer fluid from a wellbore (e.g., displacing the spacer fluid from a casing annulus during primary cementing) by introducing a second fluid (e.g., cement slurry optionally comprising a SAC) to the wellbore.

Various benefits may be realized by utilization of the presently disclosed methods and compositions. A SAC of the type disclosed herein may advantageously provide yield points ranging from about 4 Pa to about 10 Pa while providing for relatively low hydraulic friction at moderate to high shear rates for transport through drill pipe, casings, liners and open hole annulars. Low hydraulic friction simply refers to pressure drop per unit length of casing or annular flow being lower than conventional spacers and/or cement slurries.

Disclosed herein are compositions that comprises combining FHG gum with diutan gum in cement slurries to improve the rheology of the cement slurry. The phenomenon that supports this is defined as rheological coupling and it is used to quantify the synergistic effects that can be observed even at high pH1 systems such as cements.

ADDITIONAL DISCLOSURE

The following are non-limiting, specific embodiments in accordance with the present disclosure:

A first embodiment which is a suspending agent composition (SAC) comprising (i) a fast hydrating guar gum and (ii) a high molecular weight polysaccharide (e.g., diutan gum), wherein the suspending agent composition has a rheological coupling ratio for yield point ranging from about 1 to about 2 when placed in an aqueous solution at a concentration of equal to or less than about 0.5 grams/deciliter and a ratio of about 90 weight percent (wt. %) fast hydrating guar gum and 10 wt. % high molecular weight polysaccharide. In an aspect, the first embodiment of the SAC is in the form of a particulate blend (e.g., a dry or substantially dry particulate blend).

A second embodiment which is the composition of the first embodiment wherein the fast hydrating guar gum comprises fenugreek gum, *tara* gum, locust bean gum, *cassia* gum or a combination thereof and wherein the high molecular weight polysaccharide comprises diutan gum, welan gum, xanthan gum or a combination thereof.

A third embodiment which is the composition of any of the first through second embodiments wherein the fast hydrating guar has a degree of hydration of equal to or greater than about 54%, as characterized by a viscosity in 3 minutes of 25 cP or greater and a viscosity in 60 minutes of 46 cP or greater, wherein degree of hydration is defined as (the three minute viscosity in cP)/(the 60 minute viscosity in cP)×100 and wherein the 3 and 60 minute viscosity is determined by (i) hydrating the FHG gum in 500 ml tap water at 75° F. using a commercially available Waring blender with a 1200 ml capacity sample container with 4 blade impeller operating at 2000 rpm to form a 0.48 wt./wt. % gum/water hydrated FHG gum solution and (ii) determining the viscosity of the hydrated gum solution using a rotating bob/sleeve viscometer at shear rate of 511 l/sec and at a temperature of 75° F.

A fourth embodiment which is the composition of any of the first through third embodiments wherein the fast hydrating guar has a degree of hydration of equal to or greater than about 76, as characterized by a viscosity in 3 minutes of 35 cP or greater and a viscosity in 60 minutes of 46 cP or greater, wherein degree of hydration is defined as (the three minute viscosity in cP)/(the 60 minute viscosity in cP)×100 and wherein the 3 and 60 minute viscosity is determined by (i) hydrating the FHG gum in 500 ml tap water at 75° F. using a commercially available Waring blender with a 1200 ml capacity sample container with 4 blade impeller operating at 2000 rpm to form a 0.48 wt./wt. % gum/water hydrated FHG gum solution and (ii) determining the viscosity of the hydrated gum solution using a rotating bob/sleeve viscometer at shear rate of 511 l/sec and at a temperature of 75° F.

A fifth embodiment which is the composition of any of the first through fourth embodiments wherein the fast hydrating guar gum has a molecular weight of from about 20,000 Daltons to about 2,000,000 Daltons.

A sixth embodiment which is the composition of any of the first through fifth embodiments wherein the high molecular weight polysaccharide has a molecular weight of at least about 10,000 g/mol.

A seventh embodiment which is the composition of any of the first through sixth embodiments wherein the high molecular weight polysaccharide comprises diutan gum.

An eighth embodiment which is the composition of any of the first through seventh embodiments wherein the fast hydrating guar gum comprises galactomannan.

A ninth embodiment which is the composition of any of the first through eighth embodiments wherein the ratio of fast hydrating guar gum to high molecular weight polysaccharide is about 9:1.

A tenth embodiment which is the composition of any of the first through ninth embodiments further comprising an aqueous fluid.

An eleventh embodiment which is the composition of the tenth embodiment having a plastic viscosity of from about 5 cP to about 300 cP.

A twelfth embodiment which is the composition of any of the tenth through eleventh embodiments having a yield point of from about 0.5 Pa to about 50 Pa.

A thirteenth embodiment which is the composition of any of the tenth through twelfth embodiments having an AVIS-100 value of from about 10 cP to about 1500 cP.

A fourteenth embodiment which is a wellbore servicing fluid comprising (i) a suspending agent composition comprising (1) a fast hydrating guar gum; and (2) a high molecular weight polysaccharide; (ii) a cementitious material; and (iii) an aqueous fluid, wherein the suspending agent comprising about 90 weight percent (wt. %) fast hydrating guar gum and 10 wt. % diutan gum having a concentration of equal to or less than about 0.5 grams/deciliter has a rheological coupling ratio for a yield point ranging from about 1 to about 2.

A fifteenth embodiment which is the wellbore servicing fluid of the fourteenth embodiment wherein the fast hydrating guar gum comprises fenugreek gum, *tara* gum, locust bean gum, *cassia* gum or a combination thereof.

A sixteenth embodiment which is the wellbore servicing fluid of the fourteenth through fifteenth embodiments wherein the high molecular weight polysaccharide comprises diutan gum.

A seventeenth embodiment which is the wellbore servicing fluid of the fourteenth through sixteenth embodiments wherein the ratio of fast hydrating guar gum to high molecular weight polysaccharide is about 9:1.

An eighteenth embodiment which is the wellbore servicing fluid of the fourteenth through seventeenth embodiments wherein the suspending agent composition is present in the wellbore servicing fluid in an amount of from about 0.01 wt. % to about 1 wt. % based on the total weight of the wellbore servicing fluid.

A nineteenth embodiment which is a spacer fluid comprising (i) a suspending agent composition comprising (1) a fast hydrating guar gum; and (2) a high molecular weight polysaccharide; (ii) at least one surfactant; and (iii) an aqueous fluid wherein the suspending agent comprising about 90 weight percent (wt. %) fast hydrating guar gum and 10 wt. % diutan gum having a concentration of equal to or less than about 0.5 grams/deciliter has a rheological coupling ratio for yield point ranging from about 1 to about 2.

A twentieth embodiment which is the spacer fluid of the nineteenth embodiment wherein the wherein the fast hydrating guar gum comprises fenugreek gum, *tara* gum, locust bean gum, *cassia* gum or a combination thereof; and wherein the high molecular weight polysaccharide comprises diutan gum.

A twenty-first embodiment which is a method of servicing a wellbore penetrating a subterranean formation, comprising placing within a wellbore or the subterranean formation a wellbore servicing fluid comprising (i) a suspending agent composition comprising (1) a fast hydrating guar gum; and (2) a high molecular weight polysaccharide; (ii) a cementitious material; and (iii) an aqueous fluid wherein the suspending agent comprising about 90 weight percent (wt. %) fast hydrating guar gum and 10 wt. % diutan gum having a concentration of equal to or less than about 0.5 grams/deciliter has a rheological coupling ratio for yield point ranging from about 1 to about 2; and allowing the wellbore servicing fluid to set.

A twenty-second embodiment which is the method of the twenty-first embodiment wherein the fast hydrating guar gum comprises fenugreek gum, *tara* gum, locust bean gum, *cassia* gum or a combination thereof; the high molecular weight polysaccharide comprises diutan gum; the cementitious material comprises a Portland cement; and the aqueous fluid is water.

A twenty-third embodiment which is the method of any of the twenty-first through twenty-second embodiments wherein the wellbore servicing fluid has a yield point of from about 2 Pa to about 35 Pa and a plastic viscosity of from about 10 cP to about 300 cP.

A twenty-fourth embodiment which is a method of separating first and second fluids introduced to a wellbore comprising introducing the first fluid into the wellbore; introducing a spacer fluid to the wellbore, wherein the spacer fluid comprises: (i) a suspending agent composition comprising (1) a fast hydrating guar gum; and (2) a high molecular weight polysaccharide; (ii) at least one surfactant; and (iii) an aqueous fluid; and introducing the second fluid to the wellbore wherein the suspending agent composition comprises about 90 weight percent (wt. %) fast hydrating guar gum and 10 wt. % diutan gum having a concentration of equal to or less than about 0.5 grams/deciliter has a rheological coupling ratio for yield point ranging from about 1 to about 2.

A twenty-fifth embodiment which is the method of the twenty-fourth embodiment wherein the first fluid is a drilling fluid and the second fluid is a cementitious composition.

A twenty-sixth embodiment which is a method of servicing a wellbore within a subterranean formation comprising introducing a drilling fluid to an annular space formed between the wellbore and a conduit disposed therein; displacing at least a portion of the drilling fluid from the annular space with a spacer fluid; displacing at least a portion of the spacer fluid from the annular space with a cementitious fluid; and allowing the cementitious fluid to set, wherein the spacer fluid, the cementitious fluid or both comprise the suspending agent composition of claim 1.

A twenty-seventh embodiment which is a method of servicing a wellbore wherein the spacer fluid comprises (i) a suspending agent composition comprising (1) a fast hydrating guar gum and (2) a high molecular weight polysaccharide; (ii) at least one surfactant; and (iii) an aqueous fluid.

A twenty-eighth embodiment which is the method of any of the twenty-sixth through twenty-seventh embodiments wherein the cementitious fluid comprises (i) a cementitious material; (ii) an aqueous fluid and (iii) a suspending agent composition comprising (1) a fast hydrating guar gum; and (2) a high molecular weight polysaccharide into the wellbore.

A twenty-ninth embodiment which is the method of any of the twenty-sixth through twenty-eighth embodiments wherein the cementitious fluid comprises (i) a cementitious material; (ii) an aqueous fluid and (iii) a suspending agent composition comprising (1) a fast hydrating guar gum; and (2) a high molecular weight polysaccharide into the wellbore A thirtieth embodiment which is the method of any of the twenty-sixth through twenty-ninth embodiments wherein the fast hydrating guar gum comprises galactomannan and the high molecular weight polysaccharide comprises diutan gum.

A thirty-first embodiment which is a wellbore servicing fluid comprising: (i) a suspending agent composition comprising (1) a fast hydrating guar gum; and (2) a high molecular weight polysaccharide, wherein the suspending agent composition has a rheological coupling ratio for yield point ranging from about 1 to about 2 when placed in an aqueous solution at a concentration of equal to or less than about 0.5 grams/deciliter and a ratio of about 90 weight percent (wt. %) fast hydrating guar gum and 10 wt. % high molecular weight polysaccharide; (ii) a component selected from the group consisting of a cementitious material and a surfactant; and (iii) an aqueous fluid.

A thirty-second embodiment which is the wellbore servicing fluid of the thirty-first embodiment wherein the fast hydrating guar gum comprises fenugreek gum, *tara* gum, locust bean gum, *cassia* gum or a combination thereof and wherein the high molecular weight polysaccharide comprises diutan gum.

A thirty-third embodiment which is the wellbore servicing fluid of the thirty-first embodiment or the thirty-second embodiment wherein the cementitious material comprises a Portland cement.

A thirty-fourth embodiment which is the wellbore servicing fluid of any of the thirty-first through the thirty-third embodiments wherein the ratio of fast hydrating guar gum to high molecular weight polysaccharide is about 9:1.

A thirty-fifth embodiment which is the wellbore servicing fluid of any of the thirty-first through thirty-fourth embodiments wherein the suspending agent composition is present in the wellbore servicing fluid in an amount of from about 0.01 wt. % to about 1 wt. % based on the total weight of the wellbore servicing fluid.

A thirty-sixth embodiment which is a method of making a wellbore servicing fluid, comprising: blending (i) a suspending agent composition comprising (1) a fast hydrating guar gum; and (2) a high molecular weight polysaccharide, ii) a component selected from the group consisting of a cementitious material and a surfactant; and (iii) an aqueous fluid for a time under shearing conditions (e.g., shearing conditions such as high shear mixing or blending of the type produced by a commercial wellbore servicing fluid blender used at a wellsite to prepare wellbore servicing fluids in sufficient quantities for use downhole) effective to hydrate the suspending composition before the pH of the wellbore servicing fluid exceeds a pH effective to retard hydration of the fast hydrating guar gum.

A thirty-seventh embodiment which is the method of the thirty-sixth embodiment wherein the pH effective to retard hydration of the fast hydrating guar gum is equal to or greater than about 10, alternatively equal to or greater than about 10 and equal to or less than about 13, or alternatively equal to or greater than about 11 and equal to or less than about 13.

A thirty-eighth embodiment which is the method of the thirty-sixth or thirty-seventh embodiment wherein the time is from about 1 to about 10 minutes, alternatively from about 3 to about 7 minutes, alternatively from about 4 to about 6 minutes, alternatively about 5 minutes.

A thirty-ninth embodiment which is the method of any the thirty-sixth through thirty-eighth embodiments wherein the high molecular weight polysaccharide comprises diutan gum, the fast hydrating guar gum comprises galactomannan, and the ratio of fast hydrating guar gum to high molecular weight polysaccharide is about 9:1, and wherein the suspending agent composition has a rheological coupling ratio for yield point ranging from about 1 to about 2 when placed in an aqueous solution at a concentration of equal to or less than about 0.5 grams/deciliter and a ratio of about 90 weight percent (wt. %) fast hydrating guar gum and 10 wt. % high molecular weight polysaccharide

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 1:
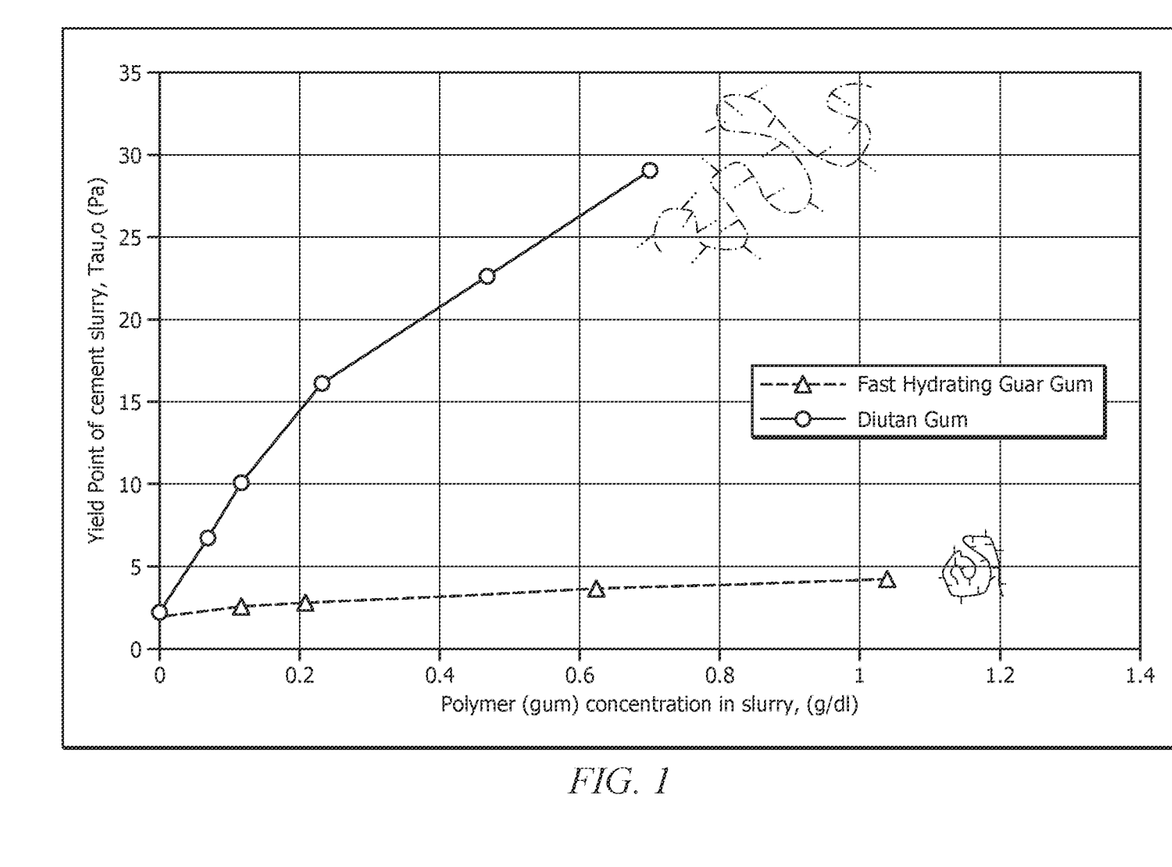
FIG. 1 is a graph of yield point as a function of polymer concentration.

The effectiveness of diutan gum and FHG gum as viscosifiers was investigated. Specifically, a dry blend of 803.4 grams of Class H1 Cement; 0.80 grams of maltodextrose and variable amounts of either diutan gum or FHG gum was prepared. This dry blend was used to make a conventional oil well cement slurry with a final wet density of 16.0 ppg, following the standard API mixing procedure for preparing cement slurries. The yield point of the slurry containing either the FHG or diutan gum was plotted as a function of the gum concentration and the results are presented in FIG. 1. In FIG. 1, the negative effects of high pH of the cement slurry upon the viscosifying effectiveness of the FHG gum was clearly observed.

The viscosifying effectiveness of diutan gum and FHG gum were compared when hydrated in normal tap water, and the results are presented in Table 1. Specifically, in normal tap water at 26° C. the FHG had an effective viscosifying power when compared to diutan gum at the moderate to higher concentrations. The higher molecular weight of the diutan gum along with its molecular structure provide significantly more viscosity at the lower concentration. However, as depicted in FIG. 1 in a cement system with high pH, the yield point of the cement with diutan gum at a gum concentration of 0.116 g/dl is four times that of the yield point with the same concentration of the FHG gum.

TABLE 1

| Concentration of gum in tap water at 26 C. (gm/dl) | Diutan gum apparent viscosity at shear rate of 1.0 1/sec (cP) | FHG gum apparent viscosity at shear rate of 1.0 1/sec (cP) |
| --- | --- | --- |
| 0.0232 | 4,264 | 71 |
| 0.0697 | 10,001 | 3,548 |
| 0.116 | 16,481 | 20,798 |

The sketches in FIG. 1, illustrate the difference between the high pH tolerance of the diutan gum vs the shrinking effect that high pH of the cement slurry has on the FHG gum. The yield point (YP) of the 16.0 ppg Class H cement slurries for both gums clearly support the assertion that guar gums normally do not perform well as viscosifiers in cements.

Example 2

The effects of gum type and concentration on the yield point of a 16.0 ppg Class H cement slurry was investigated. Specifically, the following samples were prepared: Case 1 was a base case of cement slurry with no viscosifying gum; Case 2 was a cement slurry with 0.27 g/dl concentration of FHG gum; Case 3 was a cement slurry with 0.03 g/dl concentration of diutan gum and Case 4 was a cement slurry with combination of 0.27 g/dl of FHG gum and 0.03 g/dl of diutan gum. Each sample contained 0.1% by weight of cement retarder. The results are presented in Table 2.

TABLE 2

| Test | Concentration of FHG gum (g/dl) | Concentration of diutan gum (g/dl) | Total gum concentration (g/dl) | Yield Point at 26 C., (Pa) |
| --- | --- | --- | --- | --- |
| Case 1 | 0 | 0 | 0 | 2.17 |
| Case 2 | 0.27 | 0 | 0.27 | 3.6 |
| Case 3 | 0 | 0.03 | 0.03 | 6.7 |
| Case 4 | 0.27 | 0.03 | 0.3 | 9.1 |

The $RCR_{YP}$ for the data in Table 2 was determined as follows: $RCR=(9.1-2.17)/[(3.6-2.17)+(6.7-2.17)]=1.16$. The Rheological Coupling Ratio can be expressed in a %, thus providing a relative measure of the synergy of using only 10% of diutan gum with 90% of FHG gum. The test data in Table 2 quantify a 116% synergistic rheological coupling effect of combining these two particular gums. Table 3 is another example of $RCR_{YP}$ with higher concentrations of each gum, but with the same 90% FGH gum and 10% diutan gum ratio.

TABLE 3

| Test | Concentration of FHG gum (g/dl) | Concentration of diutan gum (g/dl) | Total gum concentration (g/dl) | Yield Point at 26 C., (Pa) |
| --- | --- | --- | --- | --- |
| 1 | 0 | 0 | 0 | 2.17 |
| Case 5 | 0.45 | 0 | 0.45 | 4.2 |
| Case 6 | 0 | 0.05 | 0.05 | 10.1 |
| Case 7 | 0.45 | 0.05 | 0.5 | 11.7 |

The $RCR_{YP}$ for the data in Table 3 was determined as follows $RCR=(11.7-2.17)/[(4.2-2.17)+(10.1-2.17)]=0.96$. The test data in Table 3 quantify a 96% synergistic rheological coupling effect of combing these two particular gums. Since the $RCR_{YP}$ in these two cases decreased with increasing total gum (viscosifier) concentration, it is possible that the increased viscosity at higher concentration may inhibit or restrict the rheological coupling efficiency during the early hydration stages. Therefore, in order to determine if the Rheological Coupling of diutan gum and FHG gum is more efficient at lower concentrations, the tests were conducted in order to obtain accurate relationships between gum concentration of YP for the same 16.0 ppg Class H cement. The correlation of gum content to changes in rheology is usually linear at low concentrations. Therefore, the yield point data for the lower level concentrations of each gum were used to interpolate the remainder of yield point data for single gum type slurries. The data in Table 4 show observed data and the interpolated data obtained by this method.

TABLE 4

| Test | Concentration of FHG gum (g/dl) | Concentration of diutan gum (g/dl) | FHG gum Yield Point of cement slurry (Pa) | Diutan gum Yield Point of cement slurry (Pa) |
| --- | --- | --- | --- | --- |
| Case 1 | 0 | 0 | 2.17 | 2.17 |
| Interpolated | 0.045 | | 2.38 | |
| Case 8 | 0.05 | | 2.40 | |
| Case 9 | 0.09 | | 2.70 | |
| Interpolated | 0.135 | | 2.93 | |
| Interpolated | 0.225 | | 3.38 | |

TABLE 4-continued

| Test | Concentration of FHG gum (g/dl) | Concentration of diutan gum (g/dl) | FHG gum Yield Point of cement slurry (Pa) | Diutan gum Yield Point of cement slurry (Pa) |
| --- | --- | --- | --- | --- |
| Case 10 | 0.27 | | 3.6 | |
| Interpolated | | 0.005 | | 2.93 |
| Interpolated | | 0.015 | | 4.44 |
| Interpolated | | 0.025 | | 5.95 |
| Case 11 | | 0.03 | | 6.7 |
| Case 12 | | 0.05 | | 10.1 |
| Case 13 | | 0.1 | | 16.1 |

Just for demonstration purposes to validate that the Rheological Coupling Ratio is higher for lower concentration of combined polymers, the data from Table 4 were combined with data from Tables 2 and 3 to result in the following summary table of how total gum concentration affects the $RCR_{YP}$. Table 5.

TABLE 5

| Total Concentration of 90% FHG gum and 10% diutan gum (g/dl) | $RCR_{YP}$ |
| --- | --- |
| 0.05 | 1.99 |
| 0.15 | 1.46 |
| 0.25 | 1.07 |
| 0.3 | 1.16 |
| 0.5 | 0.96 |

Example 3

Figure 3:
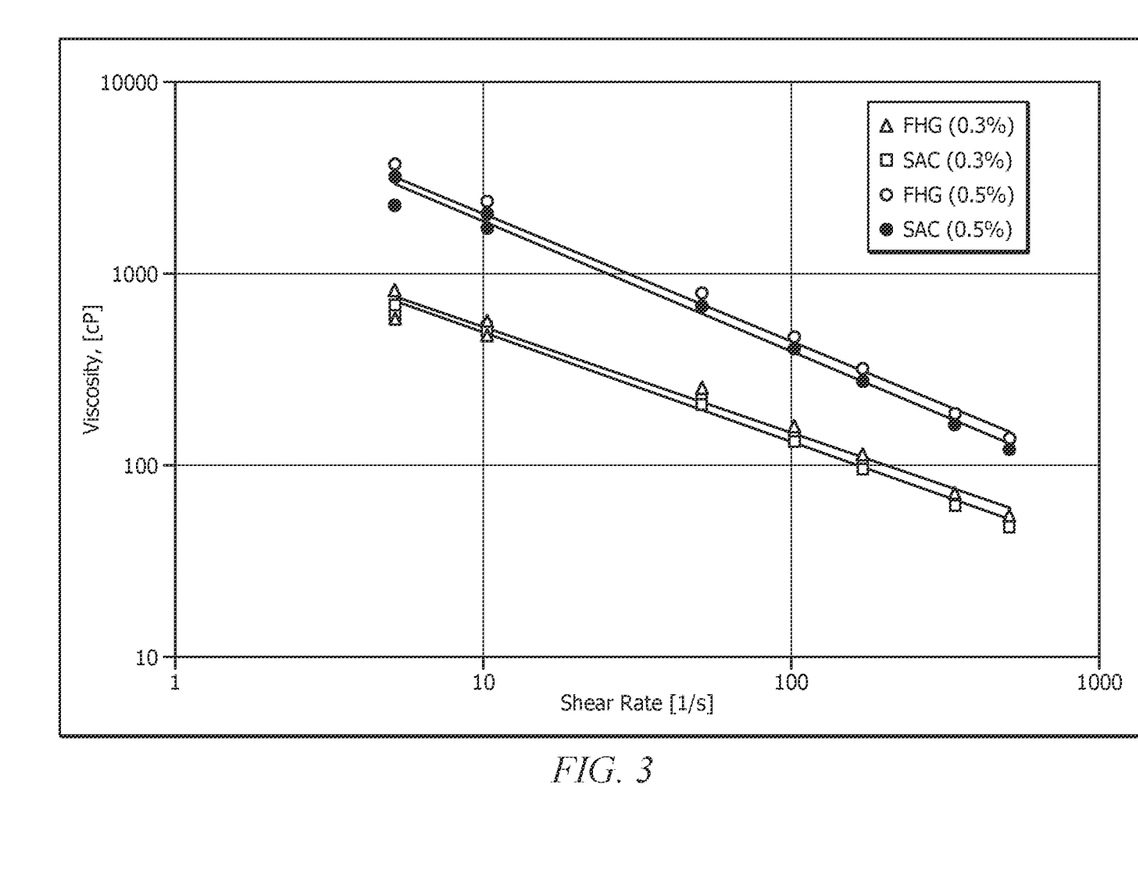
FIG. 3 is a plot of viscosity as a function of shear rate for the samples comprising the disclosed compositions.

Samples were prepared to contain either a HMWP or a SAC having a 9:1 ratio of FHG:HMWP on a weight/weight basis. A 16 ppg Lafarge Class H cement with 0.1% a modified sodium lignosulfate prepared as a reference sample at 26° C. The reference sample had a YP of 3.5 Pa and an AVIS-100 value of 90 cP. The addition of a HMWP, 0.05% by weight of cement (BWOC) to the base slurry of a Class H cement and HR, provided a YP of 10.1 Pas and an AVIS-100 of 216. Adding 0.1% BWOC of the SAC resulted in YP of 8.35 Pa and AVIS-100 of only 129 cP. Even though the YP of the SAC was 8.35 compared to a YP of 10 for the HMWP, the hydraulic friction of 129 cP was 40% less. An additional sample was prepared using a SAC having different FHG. FHG-2 and the same HMWP at a ratio of 9:1. The viscosity of samples having differing concentrations of the SAC were compared at temperatures of 26° C., 65° C. and 82° C. The results of these experiments are presented in FIG. 3.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit. $R_L$, and an upper limit. $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment. i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A suspending agent composition comprising (i) a fast hydrating guar gum and (ii) a high molecular weight polysaccharide, wherein the suspending agent composition has a rheological coupling ratio for yield point ranging from about 1 to about 2 when placed in an aqueous solution at a concentration of equal to or less than about 0.5 grams/deciliter and a ratio of about 90 weight percent (wt. %) fast hydrating guar gum and 10 wt. % high molecular weight polysaccharide.

2. The composition of claim 1, wherein the fast hydrating guar gum comprises fenugreek gum, tara gum, locust bean gum, cassia gum or a combination thereof and wherein the high molecular weight polysaccharide comprises diutan gum, welan gum, xanthan gum or a combination thereof.

3. The composition of claim 2, wherein the fast hydrating guar has a degree of hydration of equal to or greater than about 54%, as characterized by a viscosity in 3 minutes of 25 cP or greater and a viscosity in 60 minutes of 46 cP or greater.

4. The composition of claim 2, wherein the fast hydrating guar has a degree of hydration of equal to or greater than about 76, as characterized by a viscosity in 3 minutes of 35 cP or greater and a viscosity in 60 minutes of 46 cP or greater.

5. The composition of claim 1, wherein the fast hydrating guar gum has a molecular weight of from about 20,000 Daltons to about 2,000,000 Daltons.

6. The composition of claim 1, wherein the high molecular weight polysaccharide has a molecular weight of at least about 10,000 Daltons.

7. The composition of claim 3, wherein the high molecular weight polysaccharide comprises diutan gum.

8. The composition of claim 7, wherein the fast hydrating guar gum comprises galactomannan.

9. The composition of claim 1, further comprising an aqueous fluid.

10. The composition of claim 9, having a plastic viscosity of from about 5 cP to about 300 cP.

11. The composition of claim 9, having a yield point of from about 0.5 Pa to about 50 Pa.

12. The composition of claim 9, having an AVIS-100 value of from about 10 cP to about 1500 cP.

13. A wellbore servicing fluid comprising:
(i) a suspending agent composition comprising (1) a fast hydrating guar gum; and (2) a high molecular weight polysaccharide, wherein the suspending agent composition has a rheological coupling ratio for yield point ranging from about 1 to about 2 when placed in an aqueous solution at a concentration of equal to or less than about 0.5 grams/deciliter and a ratio of about 90 weight percent (wt. %) fast hydrating guar gum and 10 wt. % high molecular weight polysaccharide;
(ii) a component selected from the group consisting of a cementitious material and a surfactant; and
(iii) an aqueous fluid.

14. The wellbore servicing fluid of claim 13, wherein the fast hydrating guar gum comprises fenugreek gum, tara gum, locust bean gum, cassia gum or a combination thereof and wherein the high molecular weight polysaccharide comprises diutan gum.

15. The wellbore servicing fluid of claim 13, wherein the suspending agent composition is present in the wellbore servicing fluid in an amount of from about 0.01 wt. % to about 1 wt. % based on the total weight of the wellbore servicing fluid.

16. A method of making a wellbore servicing fluid, comprising:
blending (i) a suspending agent composition comprising a ratio of (1) about 90 wt. % of a fast hydrating guar gum; and (2) about 10 wt. % of a high molecular weight polysaccharide, ii) a component selected from the group consisting of a cementitious material and a surfactant;
and (iii) an aqueous fluid for a time under shear effective to hydrate the suspending composition before the pH of the wellbore servicing fluid exceeds a pH effective to retard hydration of the fast hydrating guar gum.

17. The method of claim 16, wherein the pH effective to retard hydration of the fast hydrating guar gum is equal to or greater than about 10.

18. The method of claim 17, wherein the time is from about 1 to about 10 minutes.

19. The wellbore servicing fluid composition of claim 13, wherein the high molecular weight polysaccharide comprises diutan gum and the fast hydrating guar gum comprises galactomannan.

20. The method of claim 16, wherein the high molecular weight polysaccharide comprises diutan gum and the fast hydrating guar gum comprises galactomannan.

* * * * *